United States Patent [19]
Culbertson et al.

[11] 4,388,451
[45] Jun. 14, 1983

[54] POLYMERS DERIVED FROM ALLYLPHENOL OR SUBSTITUTED ALLYLPHENOL AND MALEIC ANHYDRIDE

[75] Inventors: Billy M. Culbertson, Worthington; Larry K. Post, Columbus, both of Ohio; Ann E. Aulabaugh, Madison, Wis.

[73] Assignee: Ashland Oil, Inc., Ashland, Ky.

[21] Appl. No.: 306,198

[22] Filed: Sep. 28, 1981

[51] Int. Cl.$^3$ .................. C08F 26/00; C08F 22/40
[52] U.S. Cl. .................. 526/271; 525/109; 525/113; 525/114; 525/117; 525/118; 525/159; 525/161; 525/163; 528/104; 528/149; 528/152; 528/159; 528/322; 526/262; 526/313
[58] Field of Search .................. 526/271, 313

[56] References Cited
U.S. PATENT DOCUMENTS 2,818,402 12/1957 D'Alelio .................. 526/271
2,827,442 3/1958 D'Alelio .................. 526/271
2,850,481 9/1958 D'Alelio .................. 526/271
3,280,148 10/1966 Pawloski et al. .................. 260/338
4,100,140 7/1978 Abdul-Cader Zahir et al. .... 526/90

OTHER PUBLICATIONS

Principles of Polymerization, 2nd ed., pp. 246–248 and 250–251.

Primary Examiner—Harold D. Anderson
Attorney, Agent, or Firm—Wood, Herron & Evans

[57] ABSTRACT

A copolymer formed by reacting maleic anhydride or a maleimide or a mixture of these with an allylphenol, a methallylphenol, or substituted allyl or methallylphenol. The anhydride polymers are characterized as having a 1:1 molar ratio of maleic anhydride to phenol or substituted phenol. The maleic anhydride copolymers are water soluble materials, useful as epoxy resin modifiers and curatives, as ion exchange resins or membranes, laminates, and detergent additives and builders. The maleimide containing copolymers are also useful as epoxy resin modifiers and useful in the production of laminates, composites and coatings.

3 Claims, No Drawings

POLYMERS DERIVED FROM ALLYLPHENOL OR SUBSTITUTED ALLYLPHENOL AND MALEIC ANHYDRIDE

BACKGROUND OF THE INVENTION

The present invention relates to copolymers of maleic anhydride or copolymers of maleimides. Specifically, the present invention relates to copolymers formed from allylphenols or substituted allylphenols and maleic anhydride or maleimide.

Maleic anhydride does not homopolymerize easily. However, due to its polar character and ability to hydrolyze as well as other physical characteristics, this molecule possesses a great deal of potential utility if incorporated into polymers systems.

Despite the tendency of maleic anhydride not to homopolymerize, applicants have discovered that maleic anhydride, as well as maleimides, readily copolymerize with allylphenols or substituted allylphenols. The maleic anhydride copolymers are characterized by a 1:1 ratio of maleic anhydride moiety to allylphenol or substituted allylphenol moiety. In contrast, the maleimide copolymers are nonequimolar

SUMMARY OF THE INVENTION

The present invention comprises a polymer derived from an allylphenol or derivative of allylphenol having one of the following general formulas:

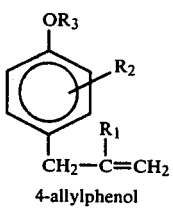
4-allylphenol

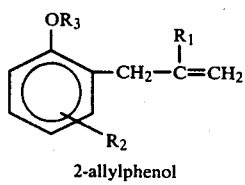
2-allylphenol reacted with a second compound having the general formula (II):

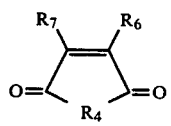

wherein $R_4$ represents $>N—R_5$ or $O$. The formed copolymer is represented by the following general formulas (IIIa) or (IIIb):

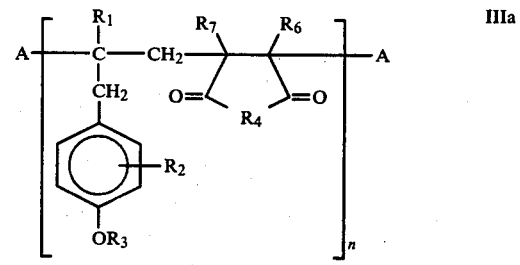

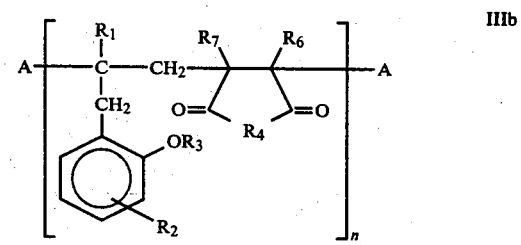

The novel maleic anhydride copolymers of the present invention are characterized by having a high degree of water solubility due to the inclusion in one polymer of a phenol in combination with a maleic anhydride moiety. The maleimide containing copolymers are readily soluble in polar organic solvents.

DETAILED DESCRIPTION OF THE INVENTION

The present invention comprises a copolymer formed from a maleic anhydride, a maleimide, or a mixture of these two and an allylphenol or a substituted allylphenol.

The allylphenols useful in the present invention are represented by formulas (IVa) and (IVb):

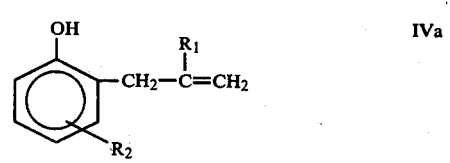

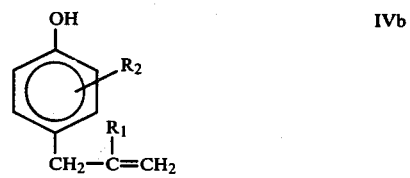

wherein $R_1$ represents hydrogen or —$CH_3$ and $R_2$ represents alkyl, aryl, substituted alkyl or substituted aryl.

In addition to the allylphenols, also useful in the present invention are substituted allylphenols having the following general formulas (Va) and (Vb):

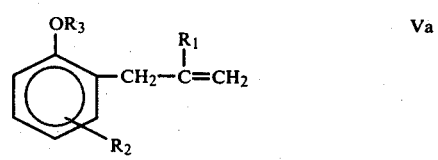

-continued

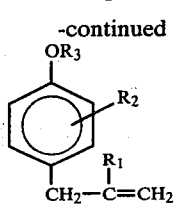

Vb wherein R₃ represents alkyl, aryl, substituted alkyl, substituted aryl, or a carbonyl.

Primarily, the groups represented by any subscripted R do not represent any moiety which would interfere with the polymerization of the allylphenol and the maleimide or maleic anhydride. Such interfering groups would include thiols, amines and strong acid groups.

The second component of the copolymer of the present invention comprises a maleimide, a maleic anhydride or a mixture of both a maleimide and maleic anhydride which is represented by the following general formula VI:

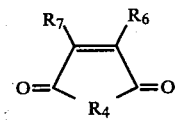

VI

In the case of a maleimide R₄ represents >N—R₅ and has the following general formula:

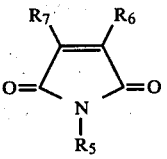

VII wherein R₅, R₆, and R₇ represent alkyl, aryl, substituted alkyl, substituted aryl and hydrogen. R₆ and R₇ may also represent a halogen such as Cl, Br or F. In the alternative, R₄ can represent O wherein formula VI represents a maleic anhydride as shown in formula VIII:

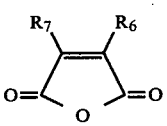

VIII wherein R₅ and R₆ represent the same moieties stated above.

The formation of the copolymers according to the present invention is accomplished by free radical polymerization, in the presence of an initiator, conducted in either bulk or solution. Suitable initiators include azobisisobutyronitrile, di-tert butyl peroxide, lauryl peroxide and benzoyl peroxide.

Where a bulk process is used, the polymerization is normally carried out at a temperature at which an initiator will perform and at which the phenol or maleic anhydride or maleimide will not decompose. It is preferred to effect polymerization at temperatures from about 70° C. to 120° C.

Where the polymerization is effected in solution, the solvent should be substantially anhydrous. Suitable solvents include ethyl acetate, 1,2 dichloroethane, toluene, methyl ethyl ketone, cyclohexanone, and xylene.

Amines would not be suitable for the present invention since they react with maleic anhydride. The temperature at which the solution polymerization should be conducted is also between 70°–120° C.

Whether conducted in bulk or solution, the time of the reaction solution will vary depending upon the reagents, initiators and solvents, but generally will be between 4–24 hours. The completion of the reaction can be determined by analysis of the reagents for unreacted olefins to determine when the reaction has stopped.

Stoichiometrically, the reaction should be conducted with a 1:1 molar proportion of allylphenol to either maleic anhydride or maleimide, or the mixture of maleic anhydride and maleimide. The polymerization should be conducted in an inert, dry atmosphere to avoid contamination or oxidation of the reagents. Suitable atmospheres include helium and nitrogen which is preferred.

According to the preceding method, copolymers and terpolymers containing allylphenol and maleic anhydride and/or a maleimide having one of the following two general formulas are prepared. When a 4-allylphenol or a substituted 4-allylphenol is reacted with the maleic anhydride or maleimide, the polymer represented by formula IXa is formed.

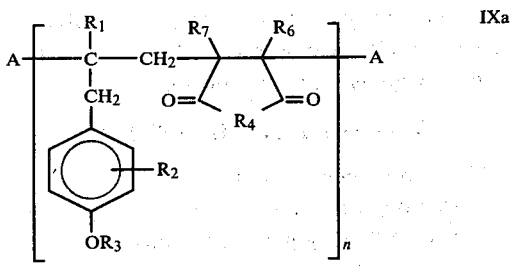

IXa

When a 2-allylphenol or a substituted 2-allylphenol is reacted, a copolymer having the following formula IXb is produced.

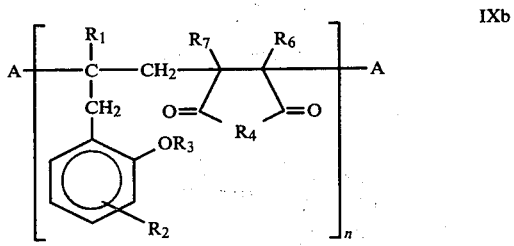

IXb

In each of the formulas IXa and IXb, A represents terminal groups of the polymer chain and n is an integer generally greater than 10.

The preparation of these polymers is further illustrated by the following non-limiting examples.

EXAMPLE I

A copolymer of 2-allylphenol and maleic anhydride was formed by mixing 9.0 grams of anhydrous 2-allylphenol together with 6.6 grams maleic anhydride and 0.2 grams azobisisobutyronitrile, the initiator, in 6.8 grams of methyl ethyl ketone. This mixture was heated for seven hours at 75°–78° C. under nitrogen. A booster of 0.22 grams azobisisobutyrlnitrile in 0.7 grams dichloromethane was then added after 3.5 hours. A solid formed and was separated and dissolved in acetone and precipitated into diethyl ether. The solid was filtered and dried leaving 10 rams (75%) polymer.

EXAMPLE II

A copolymer of 2-allylphenol and N-phenylmaleimide were formed by mixing in solution 12.9 grams of N-phenylmaleimide with 0.37 grams azobisisobutyronitrile and 21.4 grams tetrahydrofuran. This was added dropwise over a period of two hours to a heated solution of 10.0 grams of 2-allylphenol under nitrogen. After four hours, a booster of 0.12 grams of azobisisobutyronitrile was added. The mixture was then maintained at 70°–71° C. for an additional 16 hours. A solid polymer formed which was separated and dissolved in acetone. This in turn was precipitated out of solution by mixing with diethyl ether. The precipitated polymer was filtered and dried yielding 16.4 grams (72%) copolymer.

EXAMPLE III

A copolymer of 2-acetoxy allylbenzene and maleic anhydride was formed by mixing in solution 13.1 grams 2-acetoxy allylbenzene, 7.3 grams maleic anhydride, 0.24 grams azobisisobutyronitrile together with 13.6 grams methyl ethyl ketone. This solution was heated for 6.5 hours at 75°–78° C. with constant stirring under nitrogen bubbled through the reaction mixture. This mixture was cooled and the formed solid was dissolved in acetone and precipitated into diethyl ether. The solid precipitate yielded 12.4 grams (61.2%) polymer.

EXAMPLE IV

A copolymer of 2-methallylphenol and maleic anhydride was formed by mixing 10.4 grams 2-methallylphenol with 6.9 grams of maleic anhydride together with 0.26 grams azobisisobutyronitrile dissolved in 7.8 grams methyl ethyl ketone. This mixture was heated under nitrogen for seven hours at 75°–80° C. After three hours, a booster of 0.26 gram initiator dissolved in 3 grams of methyl ethyl ketone was added to the reaction mixture. A viscous solution formed which was diluted with acetone and slowly added to diethyl ether which caused the copolymer to precipitate out of solution. The precipitated copolymer was collected, washed with diethyl ether, and dried obtaining a 15.7 gram (88%) yield of white copolymer.

EXAMPLE V

A copolymer of 2-methallylphenol and N-phenylmaleimide was formed by mixing 7.4 grams of methallylphenol with 6.9 grams of N-phenylmaleimide together with an initiator 0.2 grams azobisisobutyronitrile in 14.3 grams of tetrohydrofuran. This mixture was heated under nitrogen with stirring for six hours at 70°–75° C. A viscous solution formed which was diluted with acetone and slowly added to diethyl ether to precipitate out a solid copolymer. The precipitate was collected, washed with diethyl ether, and dried to obtain a 12.3 ram (85%) yield of copolymer.

The anhydride containing copolymers of the present invention are useful generally as water soluble polymers containing maleic anhydride and phenolic or substituted phenolic groups. Accordingly, the polymers of the present invention are useful in an extremely wide variety of areas including epoxy resin modifiers and curatives, biomedical applications, molding resins, ion exchange resins, and membranes for ultrafiltration of dialysis, adhesives, laminates, foam plastics, detergent additives and builders, photographic film modifiers, coatings, fungicidal polymers, medicinal carriers, resins, oil additives, rubber additives and Portland cement modifiers. The maleimide containing copolymers, which are soluble in polar organic solvents, are also useful in plastics, adhesives, composites, and coating applications.

The following examples demonstrate the utility of the polymers formed according to the present invention in use as additives to epoxy resins.

EXAMPLE VI

Epoxy Cure Study

A sample of poly (2-allylphenol-co-maleic anhydride), prepared in Example I, was dissolved in a 50:50 (w/w) mixture of acetone and cyclohexanone to form a 50% solids solution. A mixture of 4.0 grams (0.026 equivalent) of the polymer solution, 1.60 grams (0.0084 equivalent) Epon 828, an epoxy resin and 0.04 dimethylbenzylamine were combined and thoroughly mixed. Three mil wet films were cast onto glass and cold roll steel. The films were cured in a forced air oven at 100° F. for 30 minutes and subsequently, 300° F. for 60 minutes. Properties of the cured films are outlined in Table 1.

TABLE 1

| Substrate | % Non-volatiles | Sward Hardness | 100 Rub MEK Test | Adhesion (Crosshatch) | Impact Front | Impact Reverse |
|---|---|---|---|---|---|---|
| Glass | 65 | 58 | Pass 100 | 95% | | |
| Cold Roll Steel | 65 | | Pass 100 | 100% | 20 | 0 |

EXAMPLE VII

Epoxy Cure Study

A sample of poly (2-allylphenol-co-maleic anhydride), prepared in Example I, was dissolved in a 50:50 (w/w) mixture of acetone and cyclohexanone to form a 50% solid solution. A mixture of 3.0 grams (0.019 equivalent) of polymer solution 0.61 grams (0.0032 equivalent) Epon 828, 0.42 grams (0.0032 equivalent) butyl glycidyl ether and 0.03 grams dimethylbenzylamine were combined and thoroughly mixed. Three mil wet films of this material were cast onto glass and cold roll steel. The films were cured in a forced air oven at 100° F. for 30 minutes and subsequently, for 60 minutes at 300° F. The properties of the cured films are outlined in Table 2.

TABLE 2

| Substrate | % Non-volatiles | Sward Hardness | 100 Rub MEK Test | Adhesion (Crosshatch) | Impact Front | Impact Reverse |
|---|---|---|---|---|---|---|
| Glass | 63 | 64 | Pass 100 | 100% | | |
| Cold Roll Steel | 63 | | Pass 100 | 100% | 25 | 0 |

EXAMPLE VIII

Epoxy Cure Study

A 50% solid polymer solution of poly (2-allylphenol-co-N-phenylmaleimide), prepared in Example II, with a 50:50 (w/w) mixture of acetone and cyclohexanone was formed. 3.0 grams (0.0049 equivalent) of the polymer solution, 0.93 grams (0.0049 equivalent), Epon 828 and 0.02 grams of dimethylbenzylamine were combined and thoroughly mixed. This solution was cast in three mil wet films onto glass and cold roll steel. The films were cured in a forced air oven at 100° F. for 20 minutes and 300° F. for 60 minutes. The properties of the cured film are outlined in Table 3.

TABLE 3

| Substrate | % Non-volatiles | Sward Hardness | 100 Rub MEK Test | Adhesion (Crosshatch) | Impact Front | Impact Reverse |
|---|---|---|---|---|---|---|
| Glass | 62 | | Pass 100 | 100% | | |
| Cold Roll Steel | | | Pass 90 | 100% | 20 | 0 |

EXAMPLE IX
Cymel Cure Study

A sample of poly (2-allylphenol-co-N-phenylmaleimide), prepared in Example II, was dissolved in a 50:50 (w/w) mixture of acetone and cyclohexanone to form a 50% polymer solution. A mixture of 4.0 grams (0.0065 equivalent) of the polymer solution was combined with 1.17 grams 0.0067 equivalent Cymel 303, a melamine-formaldehyde resin material and 0.02 grams catalyst 4040, a strong acid catalyst. This mixture was thoroughly combined and cast onto glass and cold roll steel in three mil wet films. The films were cured in a forced air oven at 100° F. for 30 minutes and 300° F. for 60 minutes. The properties of the cured films are outlined in Table 4.

TABLE 4

| Substrate | % Non-volatiles | 100 Rub MEK Test | Adhesion (Crosshatch) | Impact Front | Impact Reverse |
|---|---|---|---|---|---|
| Glass | 57 | Pass 90 | 100% | | |
| Cold Roll Steel | 57 | Pass 90 | 100% | 15 | 0 |

The following use examples X and XI demonstrate the polyisocyanate crosslinking of the phenolic containing maleimide copolymers. In the process, the phenolic (OH) groups react with the isocyanate (NCO) moiety, under the catalytic influence of an amine vapor, to cause crosslinking and produce insoluble coatings or films.

EXAMPLE X

A 2-allylphenol-N-phenylmaleimide copolymer was prepared by conventional free radical solution polymerization. A solution of 51.60 g N-phenylmaleimide and 1.48 g azobisisobutyronitrile in 100 g THF was added over two hours to a heated (79° C.) solution of 0.76 g naphthalene in 40.00 g 2-allylphenol under nitrogen. The solution was heated an additional 24 hours at 74° C., then cooled, and added to diethyl ether. The polymer was filtered and dried. Conversion was to 73%.

Poly(2-allylphenol-co-N-phenylmaleimide) (4.50 g) prepared above was dissolved in 4.19 g cellusolve acetate (polyurethane grade). The solution was blended with 5.35 g Mondur HC, a poly (aliphatic/aromatic) isocyanate. Total solids content was 56.8%, and the OH/NCO ration was 2:1. Thin, wet films of 1.5 mil thickness were drawn on glass plates, then placed inside a glass chamber saturated with triethylamine vapor, cure catalyst. The film was exposed for 15 seconds to 5¼ minutes. The film was hard and tack-free to the touch after a couple of minutes. Adhesion to the glass increased with increased exposure time. After one week, the film was unaffected by 10 minute exposure to xylene and 95% ethanol, but there was a slight effect upon 10 minute exposure to acetone. A film not exposed to amine vapor disintegrated after 10 minute exposure to xylene, 95% ethanol, and acetone.

EXAMPLE XI

Poly(2-allylphenol-co-N-phenylmaleimide) (2.92 g) as prepared in Example X was dissolved in 3.78 g cellusolve acetate (polyurethane grade). The solution was blended with 1.00 g Pepset resin #9086, a polyether phenolic resin. This mixture was blended with 5.79 g Mondur HC. Total solids content was 55% and the OH/NCO ratio was 2:1. Thin, wet films of 1.5 mil thickness were drawn on glass plates, then exposed to triethylamine vapor for 30 to 150 seconds. The film was hard and tack-free to the touch after a couple of minutes. Films exhibited 100% adhesion after 5 days. After one week, the film exhibited good solvent resistance after 10 minute exposures to xylene and 95% ethanol. A film not exposed to amine, showed some disintegration upon exposure to the above solvents.

These examples are meant to illustrate the utility of the present invention, but in no way limit the present invention to the uses shown. Polymers of the present invention can be generally applied to the area of water soluble polymers and also show particular utility as described in the preceding examples.

Having thus described our invention, we claim:

1. A polymer consisting of one of the following two general formulas:

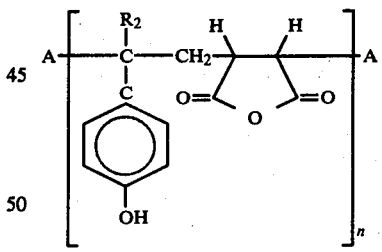

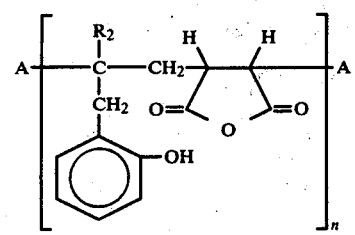

wherein $R_2$ represents H or $-CH_3$; A represents terminal groups of a polymer chain; and n is an integer greater than 10.

2. An addition polymer having the following general formula:

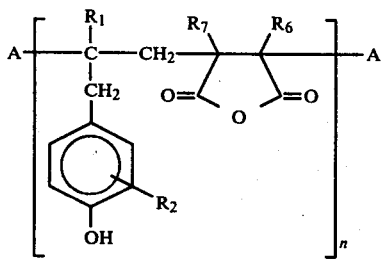

wherein $R_1$ represents H or $-CH_3$; $R_2$ represents alkyl, substituted alkyl, aryl, substituted aryl, or H; $R_6$ and $R_7$ represent alkyl, substituted alkyl, aryl, substituted aryl, H, or a halogen; A represents terminal groups of the polymer chain; and n is an integer greater than 10.

3. An addition polymer having the following general formula:

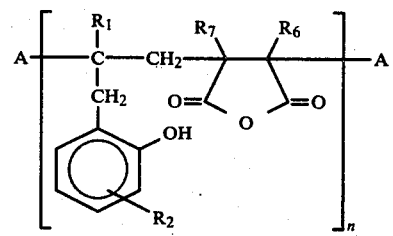

wherein $R_1$ represents H or $-CH_3$; $R_2$ represents alkyl, substituted alkyl, aryl, substituted aryl, or H; $R_6$ and $R_7$ represent alkyl, substituted alkyl, aryl, substituted aryl, H, or a halogen; A represents terminal groups of the polymer chain; and n is an integer greater than 10.

* * * * *